No. 638,303. Patented Dec. 5, 1899.
F. A. WECHSLER, J. T. LEINBERGER & J. G. SCHMIDT.
SUGAR BEET PLOW.
(Application filed Mar. 22, 1899.)
(No Model.)
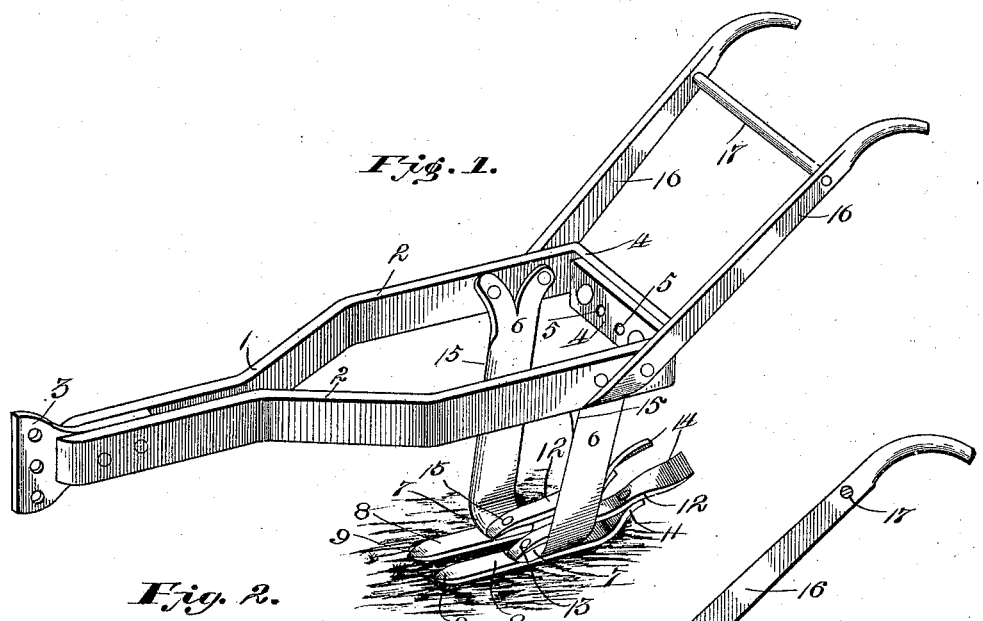
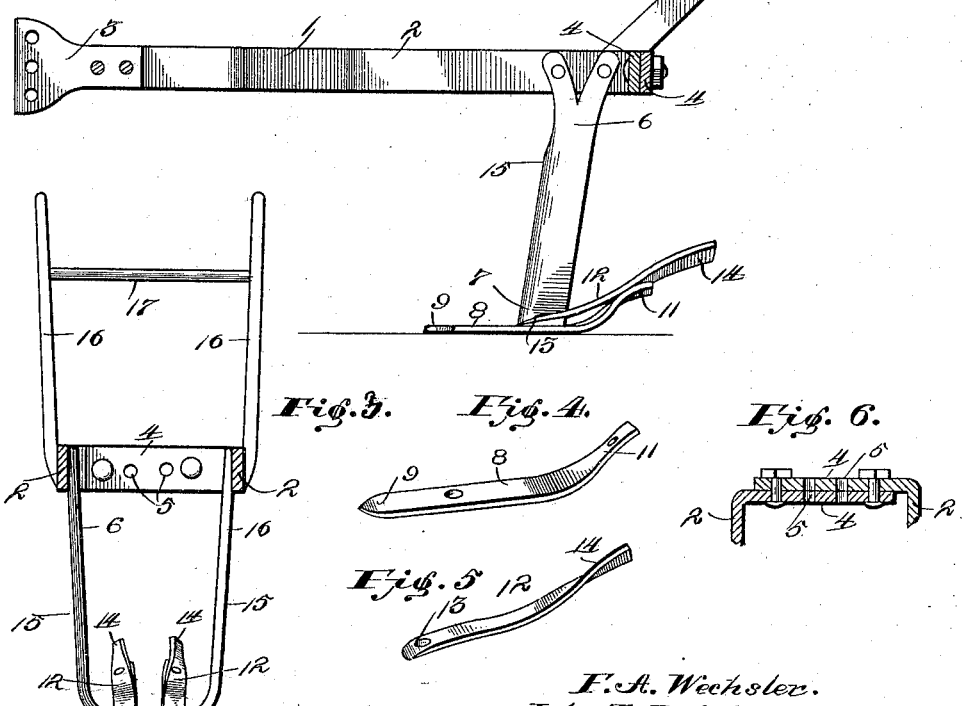
Witnesses
Clarence H. Walker
H. F. Riley
F. A. Wechsler.
John T. Leinberger.
John G. Schmidt. Inventors
By their Attorneys,
C. A. Snow & Co.

UNITED STATES PATENT OFFICE.

FREDERICK A. WECHSLER, JOHN T. LEINBERGER, AND JOHN G. SCHMIDT, OF WEST BAY CITY, MICHIGAN; SAID WECHSLER ASSIGNOR TO SAID LEINBERGER AND SCHMIDT.

SUGAR-BEET PLOW.

SPECIFICATION forming part of Letters Patent No. 638,303, dated December 5, 1899.

Application filed March 22, 1899. Serial No. 710,067. (No model.)

*To all whom it may concern:*

Be it known that we, FREDERICK A. WECHSLER, JOHN T. LEINBERGER, and JOHN G. SCHMIDT, citizens of the United States, residing at West Bay City, in the county of Bay and State of Michigan, have invented a new and useful Sugar-Beet Plow, of which the following is a specification.

The invention relates to improvements in sugar-beet plows.

The object of the present invention is to improve the construction of plows and to provide a simple, inexpensive, and efficient one adapted for harvesting sugar-beets and capable of freeing them from the soil.

A further object of the invention is to provide a plow of this character which will be capable of ready adjustment to suit the width of the rows and which will readily cut its way through the soil.

The invention consists in the construction and novel combination and arrangement of parts hereinafter fully described, illustrated in the accompanying drawings, and pointed out in the claims hereto appended.

In the drawings, Figure 1 is a perspective view of a sugar-beet plow constructed in accordance with this invention. Fig. 2 is a longitudinal sectional view. Fig. 3 is a transverse sectional view. Fig. 4 is a detail perspective view of one of the shoes. Fig. 5 is a similar view of one of the inclined bars which lift the beets from the soil. Fig. 6 is a detail sectional view illustrating the construction for adjustably connecting the sides of the plow beam or frame.

Like numerals of reference designate corresponding parts in all the figures of the drawings.

1 designates a plow beam or frame composed of two sides or bars 2, having parallel rear portions and provided with intermediate converging portions, the front ends of the sides or bars being connected by a transverse bolt or other suitable fastening devices and spaced apart to receive the shank of an attachment-plate 3. The attachment-plate 3 is provided with a vertical series of perforations adapted for the reception of a suitable clevis and capable of enabling the draft to be readily raised and lowered, as will be clearly understood. The rear ends of the sides or bars 2 are bent inward at right angles to form transverse arms or portions 4, having perforations 5 for the reception of bolts or other suitable fastening devices whereby the sides of the beam or frame are adjustably connected and are adapted to be moved to and from each other to vary the distance between them for a purpose hereinafter described.

Secured to the sides or bars 2, near the rear ends thereof, are similar oppositely-disposed standards 6, arranged at a slight inclination, as clearly illustrated in Fig. 2 of the accompanying drawings, and having their lower ends 7 curved inward to arrange them in substantially a horizontal position for supporting a pair of shoes 8. The inturned lower ends of the standards 6 are disposed at a slight inclination, and their upper ends are forked, as shown. The shoes 8, which are disposed longitudinally of the plow, are spaced apart, as shown, and they extend in advance and in rear of the supports or standards 6, their front ends 9 being pointed to enable them to penetrate the soil readily. The rear portions 11 of the shoes are bent upward at an inclination and are twisted slightly to slant their rear ends outwardly, and the said rear ends support a pair of similarly-disposed longitudinal bars 12.

The longitudinal bars 12, which have their front ends 13 secured to the upper faces of the inturned ends of the supports or standards, are adapted to lift the beets out of the ground and free them from the soil, and their rear ends 14 are twisted slightly to slant them outward similar to the rear ends of the shoes. The shoes and the longitudinal lifting-bars are adapted to pass under a row of beets, and they will free the same from the soil and lift them out of the ground.

In order to facilitate the passage of the plow through the soil, the standards or supports are provided with front cutting edges 15, and as they are disposed at a slight inclination the movement of the plow imparts to them a shearing action, so that they are enabled to cut their way freely through the ground. The adjustment of the rear ends of the bars or beams of the plow beam or frame enables the device to be varied in width to adapt it to the width of a row.

A pair of plow-handles 16 are secured to the outer faces of the bars 2 near the transverse arms thereof, and the said plow-handles are connected by a suitable transverse bar or rung 17.

The invention has the following advantages: The plow or harvesting device, which is especially adapted for digging beets, is capable of running under a row of the same and of freeing them from and lifting them out of the soil. The inclined longitudinally-disposed bars carry the beets upward and tend to throw them laterally out of the furrow, and the cutting edges of the inclined standards or supports have a shear-like action in cutting their way through the soil, and they greatly facilitate the passage of the device through the same. The plow or harvesting device is also capable of lateral adjustment to vary its width to suit the width of the rows to be operated on.

Changes in the form, proportion, size, and the minor details of construction within the scope of the appended claims may be resorted to without departing from the spirit or sacrificing any of the advantages of this invention.

What is claimed is—

1. A device of the class described comprising a pair of standards or supports, shoes mounted on the lower ends of the standards or supports and extending in advance and in rear of the same, and the inclined lifting-bars mounted on the standards or supports and supported by the rear portions of the shoes, substantially as described.

2. A device of the class described comprising a pair of standards or supports, the longitudinal shoes secured to the standards or supports and extending in advance and in rear of the same, their rear ends being inclined and slanted outwardly, and the inclined longitudinal bars supported by the rear ends of the shoes and having their rear portions also slanted outwardly, substantially as described.

3. A device of the class described comprising a pair of inclined standards having front cutting edges, the longitudinal shoes secured to the lower ends of the standards, extending in advance and in rear of the same, and having pointed front ends, and the longitudinal lifting-bars supported by the shoes, substantially as described.

4. A device of the class described comprising a pair of standards having inturned lower ends, shoes secured to the lower faces of the inturned ends of the standards and extending in advance and in rear of the same, and the longitudinal lifting-bars secured at their front ends to the upper faces of the inturned ends of the standards and having their rear portions supported by the shoes, substantially as described.

5. A device of the class described comprising a plow standard or frame composed of two side bars connected at their front ends and having their rear portions spaced apart and provided with transverse arms adjustably connected, plow-handles mounted on the frame or beam, standards depending from the latter, shoes secured to the lower ends of the standards and carried by the same in their adjustment, and the separate longitudinal lifting-bars mounted on the standards and the shoes, substantially as described.

In testimony that we claim the foregoing as our own we have hereto affixed our signatures in the presence of two witnesses.

FREDERICK A. WECHSLER.
JOHN T. LEINBERGER.
JOHN G. SCHMIDT.

Witnesses:
AUGUST WASHER,
EDWARD W. PORTER.